March 24, 1970  A. E. PARKS  3,501,999
PORTABLE HAND MILL

Filed Dec. 14, 1967  4 Sheets-Sheet 1

ARTHUR E. PARKS
*INVENTOR.*

BY *Charles E. Woodward*
ATTORNEY

March 24, 1970     A. E. PARKS     3,501,999

PORTABLE HAND MILL

Filed Dec. 14, 1967     4 Sheets-Sheet 2

ARTHUR E. PARKS
*INVENTOR.*

BY Charles E. Woodward

ATTORNEY

March 24, 1970

A. E. PARKS 3,501,999

PORTABLE HAND MILL

Filed Dec. 14, 1967

ARTHUR E. PARKS
INVENTOR.

BY Charles E. Woodward
ATTORNEY

United States Patent Office 3,501,999
Patented Mar. 24, 1970

3,501,999
PORTABLE HAND MILL
Arthur E. Parks, Azle, Tex., assignor to General Dynamics Corporation, Fort Worth, Tex., a corporation of Delaware
Filed Dec. 14, 1967, Ser. No. 690,442
Int. Cl. B23c 1/20; F16d 31/06
U.S. Cl. 90—12                    5 Claims

ABSTRACT OF THE DISCLOSURE

A portable hand mill for machining metals characterized by an exceptionally high power to weight ratio for machines of its class. It is further characterized by an inherent capacity for precluding development of operational chatter and vibration in its milling cutter by its smooth torque output and by modulation of the flow of power from its course, through a torque-shaft and into the cutter. Generally, the apparatus comprises a hydraulic power source for pumping hydraulic fluid at high pressure into a uniquely efficient hydraulic motor or rotary actuator of the radial-ball-piston-drive type, a suitable housing, hand grips, control switch, bearings, end-mill or other suitable milling cutter, cutter guide and a fly-wheel for regulating the speed and uniformity of its torque shaft and cutter, thereby providing an energy reservoir for inertially achieving smooth flow of power.

BACKGROUND OF THE INVENTION

In the metal working art and particularly in that part of this art germane to shaping, sculpturing, or sizing of a metallic workpiece by removal of particles of metal from the workpiece by the shearing action of a rotary toothed-disc, fluted-shaft or other suitable milling cutter being fed thereagainst, there is conventionally employed very massive, heavy machine tools commonly known as milling machines. Such milling machines usually consist basically of a relatively large and heavy body member, a long and heavy sliding work table, a rotary spindle, collet and a suitable mill cutter. Three basic types of milling machines that are conventionally employed by the metal working industry fall generally into the subclasses of (1) horizontal mills, (2) vertical mills, and (3) universal mills; the latter being further divided into (a) the 3-axis universal type mill and (b) the 5-axis universal mill. Such milling machines, as stated above, are typically of a massive, very heavy order of machines, varying generally within a range between the relatively light weight 5000 lbs. Dufors swivel mill which develops approximately 5 horsepower and the massive and very heavy mill exemplified by the Giddings and Lewis 5-axis Universal Spar mill, which weighs approximately 48 tons and is capable of developing spindle torque up to 30 horsepower in its rotary cutter-shaft or spindle.

While such massive, stationary conventional milling machines are essential in the metal working industry, there also exists a dire need for a portable, high-cycle swarfing mill, exemplified by the present device, which is capable of performing equivalent metal mill-work, such as planing, scarping, profiling and routing. It has been recognized for many years that this dire need exists within industry, in heavy rough and finish milling, particularly in view of a growing national critical shortage of the type of machine referenced above which is capable of such mill work, to be able to efficiently plan the production milling task to effect even a modicum of efficiency toward achieving a favorable ratio between the man-loading vs. the machine loading task. This need is significantly implemented, if not fully met, by employment of the portable, high-cycle swarf-mill of the present invention.

Further, the very substantial reduction of machine set-up time, appreciable decrease in manufacturing time, realization of a greater degree of exactness in the duplication or reproducibility of machined parts and the production of both higher quantity and higher quality end products, are each and all factors constitutive to this objective and are inherent to proficiencies imparted by employment of the present invention.

No other portable milling tool known in the art has such a high power/weight ratio nor does any other such device possess the capabilities of the present invention for universal or 5-axis routing, profiling and other types of milling gained through utilization of a power range of from one to thirty-five horsepower in its spindle drive while maintaining a constant shaft torque throughout an infinitely variable speed range up to 60,000 r.p.m. and also being of such exiguous character that it may weigh as little as five pounds, yet impart a constant cutting torque anywhere in a range of from 25 in./pounds to 103 in./pounds.

SUMMARY OF THE INVENTION

The present invention relates generally to milling machine tools. More particularly the invention relates to a class of milling tools which are commonly referred to as portable, power driven, hand-mills. Such portable hand-mills are capable of machining metal by several cutting methods such as planing, boring and scarping but are particularly adept at shallow-cut routing and profiling. The instant invention provides a capability for deep rough-cut and finish milling and particularly for routing or profiling, which normally requires the employment of massive, stationary milling machines, and may henceforth be performed quite proficiently by a single workman using the present inventive device; a device which is sufficiently endemic in character that it warrants being especially defined as a portable, high-cycle, constant-torque swarfing-mill and thereby may be limited in the art to a class of portable hand-mills which are capable of attaining spindle rotational speeds of at least 60,000 r.p.m. and further characterized as falling within a range as defined by the following bounds and critical limits:

Power Spindle Drive: 2 s.h.p.–25 s.h.p.
Torque: Constant through infinitely variable speed range up to 60,000 r.p.m.
Weight: 4 lbs.–50 lbs.

Therefore the invention resides in novel structure and function constituting a portable, high-cycle, constant-torque swarf-mill, the spindle and cutter of which, in the preferred form, is power driven by a hydraulic, radially re-acting, ball-piston type drive motor for rotating the spindle and mill cutter; a mill cutter stabilizing adaptor embodying a journal-like, cutter bracing bearing and stabilizer which receives the lower end of the mill cutter and also serves as an end-mill cutter guide medium for guiding the cutter along the inner face of an appropriate duplicating pattern plate when routing or about a profile form template when profiling. This further provides an instrumentality for stabilizing the cutter to preclude inadvertent shock deflection thereof to obviate vibratory chatter and to generally improve the finish of the cut and substantially prolong the wear life of the cutter.

An inertial fly-wheel operating concentrically and in axial alignment with the spindle and cutter of the device provides an energy reservoir for stabilizing power input against all variations or surges of antienergetic character due to aberrations in material being cut when such material is reacting against the cutter force. The gyroscopic character of this fly-wheel does further impart a stabilizing effect along its axis of rotation thereby greatly enhancing ability of the operator to manually control the portable swarf-mill, thus augmenting his natural dexterity in manipulating it through a universal, 5-axis milling task. Manual gripping means, such as fixed or spindle knobs, permit the operator to grasp and manipulate the device. An appropriate lightweight housing having small overall dimensions and a cutter related regulator means, such as a depth adjustment nut appropriately mounted thereon, provide convenient setting of the mill cutter, completing the basic embodiment of the invention. However, ancillary support means and a power source are included in a more comprehensive embodiment to constitute the composite system and also includes, in addition to the basic milling powerhead defined above, a hydraulic pumping unit interconnected with and providing support for the basic swarf-mill or powerhead by means of a ram and articulated boom arrangement which also supports related hydraulic motor conduits and the like. Such ram and boom arrangement also serves as a rack for stowage of the portable swarf-mill when not in use.

It is therefore a prime object of the present invention to provide a unique, composite high cycle swarf-mill which is capable of delivering up to 35 horsepower in rotary spindle cutting force with spindle torque remaining constant through an infinitely variable speed range up to as high as 60,000 r.p.m., yet being sufficiently light in weight and stable in operating character that a single workman can manually lift and precisely manipulate it through desired milling operations with relative ease.

Another object of the invention is to provide a portable, high cycle, constant torque and stable swarf-mill which is capable of accomplishing both rough cutting and finish milling that is equivalent to and achieves the speed and quality norm of that performed by the massive, heavy and very expensive milling machines of conventional type.

A further object resides in the provision of an apparatus of the above class and character which manifests inherent stability throughout its entire performance range and is therefore much less prone to develop operational chatter or operational instability than other portable hand mills of its class yet being both economical to manufacture and easy to construct.

Other objects and advantages of the invention will become more readily apparent from a consideration of the following description of the appended drawings, which illustrate a preferred embodiment, wherein.

Figure 1:
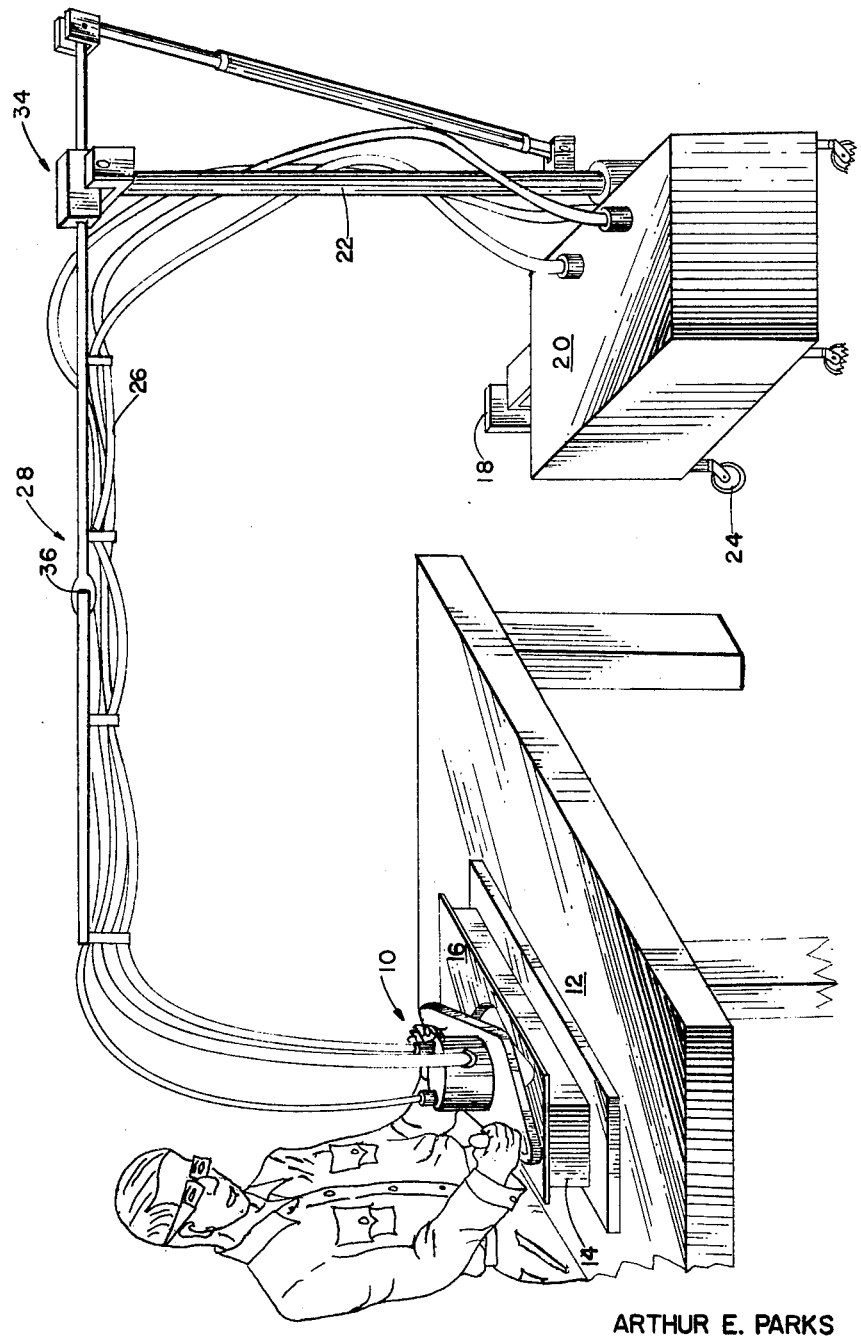
FIGURE 1 is a pictorial representation of the entire operational system for the apparatus of the present invention and generally illustrates the portable swarf-mill and its related power source; the latter being herein represented in its preferred form as a hydraulic pumping unit having a conduit supporting, articulated crane.

Referring now to FIGURE 1 of the drawings, the general arrangement and a typical routing operation of the invention is exemplified by a workpiece 14 mounted upon a work supporting platform or table 12. Appropriately positioned over the workpiece and contiguous therewith, routing template 16, which serves as a duplicating pattern plate, is affixed thereto in a conventional manner. The operator is illustrated gripping knob-like handles 32 of portable swarf-mill 10, whereby he easily controls and manually manipulates it in such manner that transition from any one plane of work to another may be accomplished, since the device is capable of universal operation through 5-axis coordinates or through any point in a given space parameter. By conventional application of other conventional templates or pattern plates and guide element adaptations this is also possible for shaping, profiling, and other similar milling operations. A truck-like hydraulic pumping composite 20, hereinafter more fully described, provides an operational power source and is generally exemplified in FIGURE 1 as being rollably mounted upon casters 24 and having the capability for ready mobility from one work location to another.

In this respect rack 18 provides a means for depositing the swarf-mill 10 during such transportation and also for stowage when not in use. Flexible hydraulic conduit 26 interconnects swarf-mill 10 with hydraulic pumping composite 20 and serves to conduct fluid, under pressure, from the pumping unit 20 to the swarf-mill 10, from whence the latter derives its cutting power, and also provides a conduit medium for return of the hydraulic fluid therefrom to its reservoir in pumping unit 20. In order that such conduit may be suspended overhead and thus preclude possible entanglement of the operator or otherwise interfere with the milling operation, an articulated, crane-like boom 28 is supported by and extends above the operator from hydraulic ram 22 and serves to suspend and support conduit lines 26 overhead. A swivel joint connection 34 permits 180° rotation of swarf-mill 10, as well as vertical angular mutation of articulated boom 28 and conduit 26 about hydraulic pumping unit 20, while hinge joint 36 permits relatively free angular movement of that portion of the conduit nearest to the operator and to that point at which it is conneced to swarf-mill 10, thus permitting it to easily follow the aberrant and asymmetrical motions of the mill as the latter is manipulated by the operator.

Figure 3:
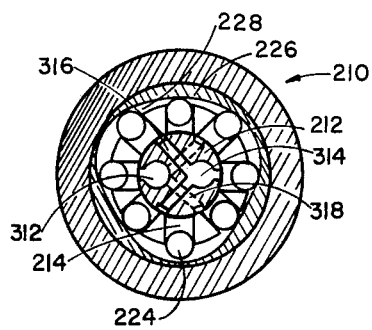
FIGURE 3 is a cross-section of the hydraulic ball-piston drive motor employed in the invention as taken at line III—III of FIGURE 2.
Figure 2:
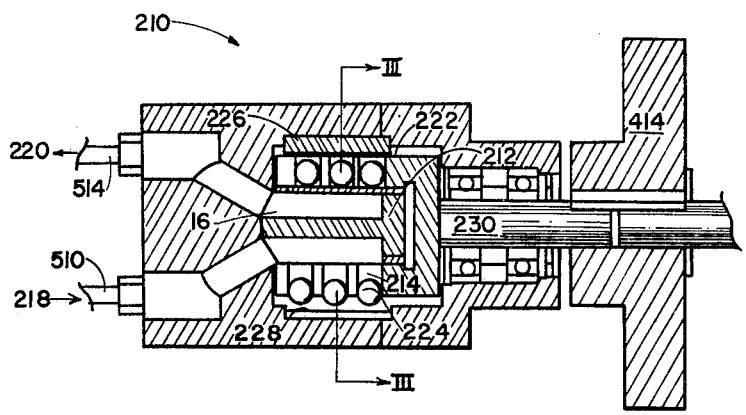
FIGURE 2 is a diagrammatic cross-sectional view of a hydraulic ball-piston drive motor employed in the invention.
Figure 5:
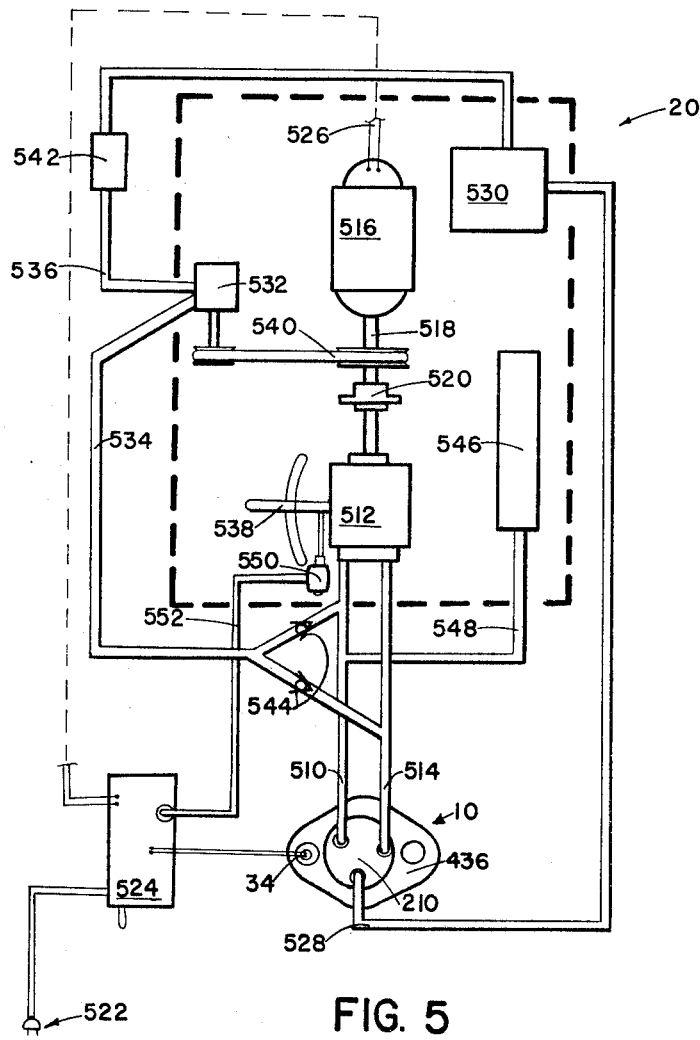
FIGURE 5 is a schematic representation of a hydraulic pumping unit and related conduit system as employed in the present invention.

To a very significant degree, the novelty and operational excellence attributable to the present invention is derived from its rotary hydraulic motor element, generally referred to by the numeral 210 in FIGURE 5 and shown in more detail by FIGURES 2 and 3. In FIGURE 2, the rotary hydraulic motor 210 is shown as being comprised of three concentric major components and several minor elements. The first and innermost of such major components is a fixed cylindrical spindle, or stator 212 which serves to conduct hydraulic fluid to and from cylinders 214. Two parallel orifices 312 and 314, FIGURE 3, are bored through its central interior. These, in turn, are interconnected by radial passages 316 and 318 to axial slots 216, FIGURE 2, which are cut into the outer surface of stator 212. In the preferred embodiment, as shown, there are six such slots; three being connected to each of the two central orifices 312, and 314, FIGURE 3, respectively. The first of such sets of orifices functions to carry pressurized fluid 218, FIGURE 2, to cylinders 214, via stator 212, and the other set serves to return fluid 220 to the pump or reservoir contained in pumping unit 20, FIGURE 1.

Concentrically and slidably positioned over stator 212 and contiguous therewitth, rotatable cylindrical sleeve or rotor 222 is journalled thereon for free yet stable rotation about the common axis. Rotor 222 contains one or more parallel rows of radially extending cylindrical apertures 214. In the preferred form as illustrated in FIGURE 2, the three parallel rows, shown as positioned axially about the rotor 222, are merely exemplary since in other embodiments more or less than three rows may be optionally employed. Further, such rows may also be helically offset, one row from the other or otherwise arranged in other patterns as may be feasible and desired. While each row may conceivably be comprised of various numbers of cylindrical apertures 214. In the preferred form each row is comprised of a number ranging from a minimum of four cylinders to a maximum of eight, all lying in a common plane. Each of these cylinders 214 receives a closely fitted but freely reciprocating spherical ball 224, which operably serves as a hydraulic piston. The third of the three major components mentioned above is a fixed cylindrical cam ring 226, which slidably yet snugly fits about, and thus concentrically envelops rotor 212 containing ball pistons 224 within the latter's cylinders 214. The inner face 228 of rotor 226, FIGURE 2, is of such configuration that in cross-section it is generally of a polytrochordal curve shape and thus describes an asymptotic closed curvature. It thereby forms a symmetrical walled enclosure constituted from contiguously integrated lobar wall segments.

Functionally, this wall segmented closure evolves into the series of camlike surfaces 228 on which balls 224 roll. As they roll, the cam contour of 228 changes the magnitude of the fluid volume in chambers 214; which chambers are defined by and sealed between stator 212 and the respective ball pistons 224. Rotor 222 and shaft 230 turn as the fluid pressure in cylinders 214 behind each ball piston 224 forces the latter to roll in declination or "downhill" on the inner cam surface 228 of cam ring 226. The cam form of face 228 is so positioned in relation to the porting 216 on stator 212 that pressure is applied to a given ball piston 224 only when the cam surface against which it is pushing is a declining or "downhill" surface. In the exemplified embodiment there are three lobes on the inner surface of the cam, so that every ball piston makes three power strokes per revolution. Therefore, in this particular embodiment, which has three rows of eight ball pistons, there are twenty-four ball pistons delivering seventy-two power strokes per revolution.

It will be readily apparent to those skilled in the art, therefore, that in any given embodiment of the sum of the radial speeds of all the ball pistons at any given instant is constant, thus providing pulse-free torque and imparting uniform fluid flow throughout the motor. It will also be apparent that all forces are balanced, both axially and radially as well as hydraulically and mechanically. Further, it will be obvious that by locating the ball pistons in different planes of rotation, a very large number of cylinders can be employed without introducing mechanical complexities and related functional complications, thereby permitting a very substantial increase in torque output at lower speeds. It also follows that the upper limit of the motor's speed capability is limited only by the maximum volume of the hydraulic fluid which can be passed through the inlet and returned through the outlet port at any given instant. It has been calculated that 60,000 r.p.m. is well within the realm of feasibility for the magnitude of the upper limit of the speed range possible for the present concept of a portable, high cycle, constant torque swarf-mill.

When the work to be milled is of such character that a change in torque or horsepower output of the cutting spindle is desired, it will be obvious to those skilled in the art that the speed-torque-horsepower combination may be infinitely varied by modification of the constant displacement ball piston motor, hereinabove described, in such manner as to convert it into a variable displacement unit. This may readily be accomplished by changing the inner face 228 of cam ring 226 so that not only an asymptotic closed camming curvature is described by such face but that it also simultaneously makes a cyclical series of rotary, lateral librations; one complete cycle in each 60° of rotation, throughout the 360° of the inner face of the cam ring. Then by the simple expedient of sliding the cam ring laterally in respect to rotor 222 and stator 212, and consequently in respect to ball piston 224 and cylinder 214, fluid displacement from the latter may be selectively varied at will. Such variable displacement motor when employed in conjunction with the subsequently described variable displacement hydraulic pump 512, FIGURE 5, provides the operator with either a constant torque or constant horsepower spindle output for swarf-mill 10.

When the motor is controlled only by the volume magnitude of the flow from the pump 512, constant torque is provided throughout the motor's speed range. When spindle speed is controlled by changing the motor displacement only, then constant horsepower is delivered to the cutting spindle over a wide speed range. Motor speed can be controlled by the operator's changing both the pump and motor's displacement simultaneously to thereby effect an infinite number of horsepower-torque combinations.

Figure 4:
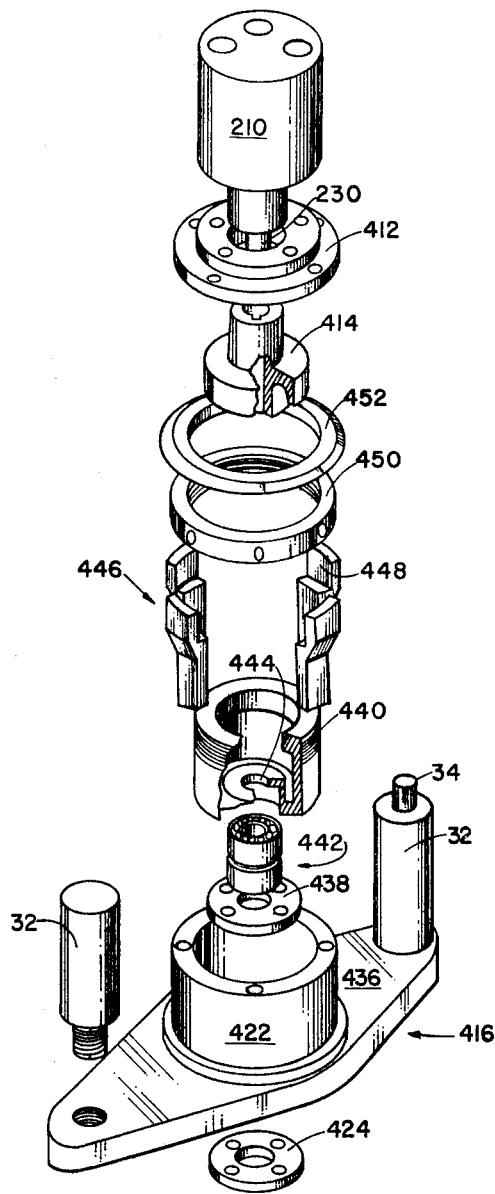
FIGURE 4 is an exploded perspective of the swarf-mill of the present invention showing the functional relationship of its operational elements and the manner of their assemblage so as to form the composite unit.

Referring now to FIGURE 4, drive shaft 230, of FIGURE 2, passed through cover plate 412 of a swarf-mill composite base plate is keyed or otherwise suitably coupled to flywheel 414 and housing 416. Flywheel 414 is suitably adapted for receiving and clampably securing the shank 418 of end-mill cutter 420, as with chuck jaws or the like. End-mill 420 is concentrically received into housing 422 by being slidably passed through container plate 424 affixed by bolts or other suitable fastening means to the lower face of the housing plate 416. The fluted cutting edge of end-mill cutter 420 is slidably passed through a circular concentric shoulder guide 426 and its lower end is journalled in bearing journal 428, which forms the lower extremity of cutter stabilizing support 430, fixedly connected to guide 426 by a rigid nexus 432 of arcuate configuration.

Assembled between flywheel 414 and end-mill cutter 420 so that they are contained within housing 422, the remaining functional and operational elements comprising the portable swarf-mill composite unit are conventional structures or mechanisms and need be only briefly described for a ready understanding of both their structure and function. Container plate 424, heretofore described, is fitted about a concentric aperture which passes through the base plate 436 of housing 422 and is of sufficient diameter for accommodating cutter 420.

An upper plate 438 is positioned opposite container plate 424 and is rigidly bolted or otherwise connected to the latter through the base 436 plate of housing 422. Bearing housing 440 containing roller bearings 442 is positioned within housing 422 immediately above upper plate 438 and has a concentric aperture 444 through which end-mill shank 418 is passed to form the swarf-mill's spindle when the former is chucked into flywheel 414. A plurality of upstanding supports 446 having off-set shouldered flanges 448 are fitted between the outer wall of bearing housing 440 and the inner wall of swarf-mill housing 422 for receiving an internally threaded depth adjustment nut 450. Nut 450 is operable for raising or lowering cutter 420 as the former is turned clockwise or counterclockwise respectively, whenever adjustment of depth of cut is desired, thus providing for fine vertical micromatic adjustment for precision milling work. A cover ring 452 is provided for the entire housed assembly and cover plate 412 is, in turn, bolted or otherwise fixedly attached thereto to effect operable containment of the described assemblage within housing composite 416.

The electro-hydraulic system operably interconnecting hydraulic power unit 20, FIGURE 1, with the hydraulic ball driven motor component of portable swarf-mill 10, heretofore described and shown in detail in FIGURES 2 and 3, and the related electrical controls are shown by FIGURE 5 in a block diagram format. Ball piston drive motor 210, FIGURE 2, receives pressurized hydraulic fluid, indicated by the numeral 218, through conduit 510, from a conventional variable displacement hydraulic pump 512. Return flow from the ball piston drive motor 210 to pump 512 is effected through conduit 514. Pump 512 is driven by electric motor 516 through the latter's drive shaft 518 interconnected to the driven shaft of the former by torque shaft coupling 520. Electric motor 516 receives its electrical voltage from a conventional electric power source connection 522 via control panel 524 and electrical conduit 526. While the swarf-mill's operating hydraulic power is basically derived from a substantially closed hydraulic system between hydraulic pump 512 and the ball piston motor 210 of portable swarf-mill 10, as cycled through conduits 510 and 514, it is well known to those skilled in the hydraulic art that from a practical standpoint no hydraulic system can be positively sealed to the degree that when such a system is operated under high pressures, sealing will be one hundred percent effective but rather that an inveterate, exiguous fluid efflux factor always exists and therefore must be taken into consideration.

In order to compensate for the resultant pressure loss, prescient accommodations must be incorporated into the system for return such exuded fluid to its operational cycle or, alternatively, to a reservoir of operational fluid. In the present instance, case drain conduit 528 implements the latter purpose by serving to conduct all exiguous fluid efflux from hydraulic motor 210 (from swarf-mill 10) back to reservoir 530. In order to preclude an undesirable drop in the system's normal operating pressure, resultant from pressure loss due to the above described exiguous fluid efflux, supercharger pump 532, and related conduit 534 and 536 are provided. The hydraulic fluid being urged through conduit 510 by pump 512 and returned through conduit 514 is maintained at a predetermined minimum pressure by controlling the output of variable displacement pump 512 with throttle control lever 538. Should line pressure within conduit 510 and 514 fall below the pre-set valve, supercharger pump 532 driven by electric motor 516 through sheaved belt 540, and drawing fluid from reservoir 530 through line filter 542, will augment the fluid volume within lines 510 and 514 by pumping the fluid through conduit 534 until the pressure differential then existing across one-way relief valves 544 in nulled and operating pressure immediately restored within swarf-mill motor 210.

In order to preclude line cavitation in conduit 510 due to sudden back pressure developing when the swarf-mill is being turned on or shut down and to further prevent sudden and possibly violent buffeting and jerking of internal operational mechanisms within the ball piston drive motor and within the swarf-mill, in general, pressure accumulator 546, which interconnects to line 510 via conduit 548, serves to engender a cushioning effect within the hydraulic system by compensating for sudden pressure changes in line 510. The operator manually controls the speed of swarf-mill 10 by means of control button 34, FIGURE 4. This provides the operator with a rheostat-like control of actuator 550, via conduit 552, which in turn is operably connected throttle control 538 for varying the displacement of pump 512. While pump 512 may be of the constant stroke type, as shown in the preferred form of the invention, a variable displacement type pump selected to function in a given torque and speed range is preferable. When swarf-mill 10 is powered by fluid that is driven by a pump having a variable stroke, it endows the mill with either constant torque or constant horsepower output. When a constant stroke pump is employed the speed of ball piston motor 210 is controlled only by the volume of flow from pump 512 and thus constant spindle torque is maintained throughout the speed range of the motor. The ball piston motor's speed is varied by movement of throttle lever 538, which in turn is controlled by the operator by means of thumb control button 34 via control panel 524, conduit 552 and solenoid actuator 550. Alternately to the above, when the spindle speed of the swarf-mill is controlled by varying the motor displacement only, then constant horsepower is delivered over a wide speed range. Motor speed of ball piston motor 210 is controlled by simultaneously varying both pump and motor displacements, thereby producing an infinite number of horsepower-torque combinations as may be requierd for the milling operation task.

In summary, the hydraulic hand-mill of the present invention is an improved composite apparatus and related hydraulic system that results in a high-cycle, portable, compact and light-weight rotary metal cutting tool that inherently exhibits a very high power/weight ratio; an exceptionally smooth torque output and both a volumetric and mechanical efficiency that substantially approaches 100% and will consistently remain in the 95%–99% range. Further, there is provided a portable, high-cycle hand-mill which may selectively be either endowed with constant torque throughout an infinitely variable speed-range up to a practical limit of 60,000 r.p.m. or when employed in conjunction with a conventional variable displacement hydraulic pump, with a constant horsepower output over this speed range. It follows, therefore, that motor speed may also be controlled by selectively employing both a variable stroke pump and a variable drive motor and by simultaneously changing both; thus, as explained above, an infinite number of horsepower-torque combinations may be achieved throughout the speed range. Further, since all rotating parts are in a state of complete static and dynamic balance, deleterious chatter and vibrations of the cutting tool spindle shaft is substantially eliminated. Additionally, such chatter and vibrations are further inhibited and substantially neutralized by the inertial character of flywheel 414 through which each impact renitency must pass and be substantially absorbed before leaving the mill's cutter and entering the torque shaft of the ball piston motor.

I claim:

1. A portable, high-cycle hand-mill, comprising in combination:
   (A) a high-cycle rotary motor;
   (B) spindle means, comprising, in combination:
      (1) a ramekin-like, circular flywheel, rotatably responsive to said motor;
      (2) a cylindrical shaft segment, having a keyway cut into its innerface for concentric coupling thereof to the drive shaft of said motor and extending upwardly from the central part of the upper face of said flywheel in concentric relationship therewith;
      (3) a clamping jaw chuck fixedly associated with a central lower portion of said flywheel for receiving and making fast the shank of a mill-cutter;
      (4) at least one friction bearing concentrically positioned in respect to said shaft segment in order to receive the spindle assembly therethrough;
      (5) a cutter stabilizing support concentrically depending from the underface of a base plate of a housing composite having a circular shoulder guide at its upper extremity and a bearing journal at its lower extremity with said shoulder guide and said bearing journal fixedly connected by a rigid nexus of arcuate configuration, whereby the lower end of a mill cutter may be journalled and stabilized against inadvertent, work induced, impact shocks, thus substantially precluding development of deleterious vibrations and chatter within the cutter and spindle;
      (6) a container plate positioned concentrically about the central aperture of the base plate of the housing composite on both the upper face and lower face thereof to provide means for fixedly attaching said cutter stabilizing support to the base plate, and wherein said housing means comprises, in combination:
         (a) a first walled receptacle,
         (b) a base plate having a central aperture therethrough for receiving a mill cutter,
         (c) a second walled receptacle threaded about the outer face of the upper portion of the wall thereof rotatably receiving an internally threaded adjustment nut operable for precise vertical adjustment of said spindle; said second walled receptacle concentrically received into the walled enclosure of said first receptacle, said second walled receptacle further serving to seat at least one bearing into an apertured concavity defined by its boss-like, base enclosure,
(d) a plurality of spaced apart, vertically upstanding shouldered supports for receiving and supporting said second threaded-wall receptacle and said adjustment nut when operably engaged,
(e) a retainer ring for retention of the assemblage within said first walled receptacle; and
(7) an apertured cover-plate for encasement and securing of the housing assemblage within said first walled housing and for receiving said flywheel spindle shaft therethrough;
and wherein said power source composite, comprises in combination:
(a) a variable displacement hydraulic pump for driving the working fluid into and through said hydraulic motor,
(b) an electric motor coupled to said pump for rotational operation of the latter,
(c) means for selectively and precisely varying the displacement stroke of said hydraulic pump,
(d) supercharger pumping means operably associated with said electric motor for maintaining a predetermined optimum volume of hydraulic fluid and resultant magnitude of pressure in the operating system including conduit interconnecting said pump and said ball-piston motor.
(e) a pressure accumulator in operable communication with the inlet port of said ball-piston motor for maintaining a constant obtrusive pressure within the fluid circuit precluding development of adverse line-surge or back pressure and resultant cavitation therewithin,
(f) a hydraulic fluid reservoir for maintaining an adequate supply of hydraulic fluid for operation of the power system, and
(g) an electrical, central control console for manual electro-hydraulic power control and operation of the hand-mill system.

2. A portable swarf-mill characterized by an exceptionally high power to weight ratio and capability for selectively delivering an infinite number of horsepower/torque combinations through an infinite speed range up to a practical limit, comprising in combination:
(A) a high-cycle, rotary, hydraulic ball-piston motor capable of effecting at least two ball-piston strokes per rotor revolution,
(B) spindle means comprising, in combination:
(1) a rotary inertial mass responsive to said motor,
(2) a coupling device for concentrically engaging said inertial mass with the drive shaft of said motor,
(3) a chucking device depending from the central lower portion of said inertial mass for receiving and fixedly retaining the shank portion of a mill-cutter,
(4) at least one friction bearing concentrically positioned in respect to said spindle and adapted for receiving the spindle shaft therethrough,
(C) a housing composite comprising, in combination:
(1) a first walled receptacle,
(2) a base plate having a central aperture therethrough for receiving a mill cutter,
(3) a second walled receptacle threaded about the outer face of the upper portion of the wall thereof rotatably receiving an internally threaded adjustment nut operable for precision vertical adjustment of said spindle and consequently of the mill cutter attached to the lower end thereof in relation to the workpiece, said second walled receptacle being concentrically received into the walled enclosure of said first receptacle, with said second walled receptacle further serving to seat at least one friction bearing into an apertured concavity defined by its base enclosure,
(4) a plurality of spaced apart, vertically upstanding shouldered supports for receiving and supporting said second threaded-wall receptacle and said adjustment nut when operably engaged,
(5) a retainer ring for retention of the assemblage within said first walled receptacle, and
(D) an apertured cover-plate for encasement and securing of the housing assemblage within said first walled housing and for receiving said spindle shaft of said inertial mass therethrough,
(E) a cutter stabilizing support concentrically depending from the underface of said housing composite,
(F) a hydraulic power source composite, comprising in combination:
(1) a variable displacement hydraulic pump for driving the working fluid into and through said hydraulic motor,
(2) a drive motor coupled to said pump for high speed rotational operation of the latter,
(3) means for selectively and precisely varying the displacement stroke of said hydraulic pump,
(4) supercharger pumping means operably associated with said electric motor for maintaining a predetermined optimum volume of hydraulic fluid and resultant magnitude of pressure in the operating system including conduit interconnecting said pump and said ball-piston motor,
(5) a pressure accumulator in operable communication with the inlet port of said ball-piston motor for maintaining a constant obtrusive pressure within the fluid circuit precluding development of adverse line-surge or back pressure and resultant cavitation therewithin,
(6) a hydraulic fluid reservoir for maintaining an adequate supply of hydraulic fluid for operation of the power system, and
(7) an electrical, central control console for manual electro-hydraulic power control and operation of the hand-mill system.

3. A hydraulic, rotory type swarf-mill composite of the class characterized by a functional capability for high cycle operational, constant-torque spindle delivery through an infinitely variable speed range, while simultaneously exhibiting a very high power to weight ratio comprising, in combination:
(A) a lightweight, high powered, constant stroke, rotary ball-piston hydraulic motor having an integral, multilobe, ball-piston race for effecting a plurality of ball-piston strokes for each revolution at its rotor delivering a constant torque,
(B) spindle means responsive to torque generated by said hydraulic motor,
(C) means responsive and attached to said spindle means for imparting inertia thereto and providing operational smoothness and stability in said spindle and its cutter element to thereby preclude development of chatter, wobble or other machine tool vacillations therein,
(D) housing means, including a base plate having guide means therein for cooperation with the workpiece providing for manipulation of the milling head over and about the workpiece, and
(E) a composite power source, including a hydraulic, variable stroke pump, whereby said hand-mill may be operated to deliver constant torque throughout an infinite, high cycle speed range up to its practical critical limit with horsepower directly proportional to pump output.

4. A hydraulic, rotary, swarf-mill composite of the class characterized by a functional capability for high cycle operational constant horsepower spindle delivery through an infinitely variable speed range, exhibiting, a very high power to weight ratio comprising, in combination:
  (A) a lightweight, high powered, variable stroke, rotary, ball-piston hydraulic motor having an integral, multi-lobe, ball-piston race for effectuating a plurality of ball-piston strokes for each revolution of its rotor delivering a constant horsepower,
  (B) spindle means responsive to torque generated by said hydraulic motor,
  (C) means repsonsive and attached to said spindle means for imparting mass inertia thereto and providing operational smoothness and cutting stability in said spindle and its cutter element to thereby preclude development of chatter, wobble and other tool vacillations,
  (D) housing means, including a base plate having means therein for guiding cooperation with the workpiece providing for manipulation of the milling head composite over and about the workpiece during the milling operation, and
  (E) a composite power source in conduit communication with said ball-piston hydraulic motor and including a hydraulic, variable stroke pump, whereby said swarf-mill may be selectively operated to deliver an infinite number of horsepower/torque combinations throughout an infinite speed range, including high cycle operation, up to its practical critical limit.

5. A high cycle swarf-mill system for removing metal, comprising, in combination:
  (A) a milling head composite having a relatively very high power to weight ratio, comprising, in combination:
    (1) a high cycle, radial ball-piston type hydraulic motor delivering at least two strokes of each radial ball-piston for each single rotor revolution and selectively capable of delivering constant shaft torque or variable torque and constant shaft horsepower or variable horsepower throughout an infinitely variable speed range up to a practical high cycle physical limit,
    (2) spindle means responsive to torque generated by said hydraulic motor, comprising in combination:
      (a) a coupling shaft having means for engaging said spindle with the drive shaft of said hydraulic motor,
      (b) chucking means operably engaged with the lower end of said spindle for reception and fixed retention of the shank of a cutting tool,
      (c) at least one friction bearing concentrically positioned in respect to the centerline of said spindle for operably receiving said spindle therethrough,
    (3) a housing assembly, including a base plate having a cooperating guide means thereon for guiding said spindle means,
    (4) a cutter stabilizing support element depending from said base plate for receiving a cutting tool therethrough and restraining it against inadvertent, work induced shocks thus precluding the development of bending in or bowing of a cutter during high lateral loading thereof,
    (5) a rotary inertia imparting means responsive to torque from said spindle means for precluding abrupt changes in r.p.m. or shaft torque that would ordinarily cause chatter, vibration and other deleterious work induced vacillation to develop in the cutting tool, and
    (6) a depth adjusting device for precise vertical adjustment of the cutting tool in relation to the work to be cut,
  (B) a mobile power source composite, comprising in combination:
    (1) a variable displacement hydraulic pump,
    (2) means for varying the stroke of said hydraulic pump,
    (3) fluid reservoir means, and
    (4) fluid conduit means interconnecting the operational and control elements of said pumping, supercharging and reservoir means and also functionally combining said radial ball-piston hydraulic motor with said power source composite,
    (5) articulated suspension means for movably supporting said milling head and said fluid conduit interconnecting said milling head with said power source composite.

References Cited

UNITED STATES PATENTS

| | | | |
|---|---|---|---|
| 2,042,480 | 6/1936 | Patterson | 60—53 X |
| 2,490,878 | 12/1949 | Marsh | 90—12 X |
| 2,646,755 | 7/1953 | Joy | 60—53 X |
| 2,910,920 | 11/1959 | Bidart | 90—12 |
| 2,988,119 | 6/1961 | Godfrey et al. | |
| 3,169,415 | 2/1965 | Welty | 77—42 X |
| 3,199,297 | 8/1965 | Croswhite. | |

GIL WEIDENFELD, Primary Examiner

U.S. Cl. X.R.

60—53